United States Patent
Akiyama et al.

(10) Patent No.: US 7,603,682 B1
(45) Date of Patent: Oct. 13, 2009

(54) DIGEST VIDEO BROWSING BASED ON COLLABORATIVE INFORMATION

(75) Inventors: Koji Akiyama, Yokohama (JP); Yusuke Kitagawa, Yokohama (JP); Tasaku Otani, Kawaguchi (JP); Kotaro Shima, Meguro-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/246,901

(22) Filed: Oct. 7, 2008

(51) Int. Cl.
*H04H 60/33* (2008.01)
*H04H 60/32* (2008.01)
*H04N 7/16* (2006.01)

(52) U.S. Cl. ............... 725/9; 725/14; 725/139
(58) Field of Classification Search ............ 725/9, 725/14, 19, 21
See application file for complete search history.

(56) References Cited

U.S. PATENT DOCUMENTS

| | | | | |
|---|---|---|---|---|
| 6,342,908 | B1* | 1/2002 | Bates et al. | 715/798 |
| 2002/0069403 | A1* | 6/2002 | Itoh et al. | 725/9 |
| 2002/0120925 | A1 | 8/2002 | Logan | |
| 2003/0030669 | A1* | 2/2003 | Ono | 345/747 |
| 2006/0218573 | A1* | 9/2006 | Proebstel | 725/14 |
| 2007/0041706 | A1* | 2/2007 | Gunatilake | 386/95 |
| 2007/0250901 | A1 | 10/2007 | McIntire et al. | |
| 2007/0282948 | A1 | 12/2007 | Praino et al. | |
| 2008/0306807 | A1* | 12/2008 | Amento et al. | 705/10 |
| 2009/0113466 | A1* | 4/2009 | Amitay | 725/9 |

* cited by examiner

*Primary Examiner*—John Miller
*Assistant Examiner*—Chris Parry
(74) *Attorney, Agent, or Firm*—Yee & Associates, P.C.; Ingrid M. Foerster (57) ABSTRACT

A computer implemented method determines interest in video portions. A media stream including frames, and a composite rating counter including interest levels are retrieved. Each interest level corresponds to a frame. When viewed at normal playback rate, interest levels associated with the frame are increased by a normal amount. Interest levels associated with the frame are increased or decreased by an augmented amount based on a relative window size compared to the default window size, an order of z-index among all open windows, and a user selection of the frame indicating an interest level. The composite rating counter is updated based on a current count of the interest levels. The updated composite interest level is then stored for future retrieval by a subsequent user.

3 Claims, 4 Drawing Sheets

DIGEST VIDEO BROWSING BASED ON COLLABORATIVE INFORMATION

BACKGROUND OF THE INVENTION

1. Field of the Invention

The present invention relates generally to a computer implemented method. More specifically, the present invention is related to a computer implemented method for determining an interest level in various portions of a video.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols. The Internet may carry information and provide services. The information and services include, for example, electronic mail, online chat services, file transfers, web pages, and other resources.

The Internet is a commonly used source of information and entertainment. Further, the Internet is also used as a medium for business activities. Many businesses, government entities, and other organizations have a presence on the Internet using websites to perform various transactions. Various organizations may offer goods and services. These goods and services may involve a sale of goods that are to be shipped to a customer. The goods also may be software and/or data purchased by a customer and transferred over the Internet to the customer.

Recently, wider bandwidth has become available on the Internet, creating large advances in the connection environment. Video sharing, video distribution, and social networking services offering video in a streaming format has become widely available. Additionally, as the availability and social sharing capacity of the video format increases, the file size and temporal video length also tends to increase.

BRIEF SUMMARY OF THE INVENTION

According to one embodiment of the present invention, a computer implemented method determines an interest level in various portions of a video. A media stream is retrieved. The media stream includes a plurality of frames. A composite rating counter is also retrieved. The composite rating counter includes a plurality of interest levels. Each of the interest levels corresponds to one of the plurality of frames. The media stream is then viewed at one of several playback rates. When a frame is viewed at normal playback rate, interest levels associated with the frame are increased by a normal amount. When the frame is viewed at a playback rate that is different from normal playback rate, interest levels associated with the frame are increased by an amount that is inversely proportional to the playback rate. When the window that is playing the media stream has been resized from the default size, interest levels associated with the frame are increased proportionally to the relative size to the default size. When the window's z-index has been changed, interest levels associated with the frame are increased inversely proportional to the order of z-index. If a user selection of the frame is received indicating an increased interest level in the frame, the associated rating counter is increased by an increased amount. If a user selection of the frame is received indicating a decreased interest level in the frame, the associated rating counter is decreased by the increased amount. The composite rating counter is then based on a current count of the first interest levels. The updated composite interest level is then stored for future retrieval by a subsequent user.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
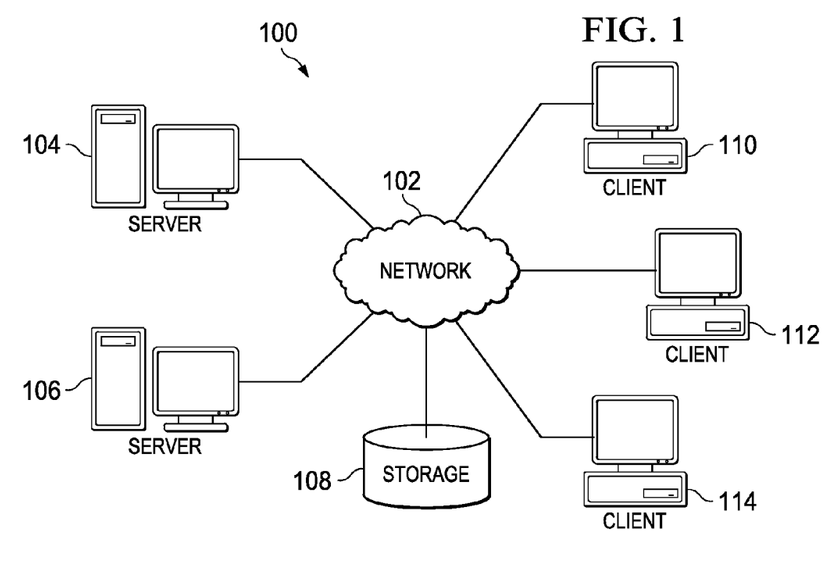
FIG. 1 depicts a pictorial representation of a network of data processing systems in which illustrative embodiments may be implemented.
Figure 2:
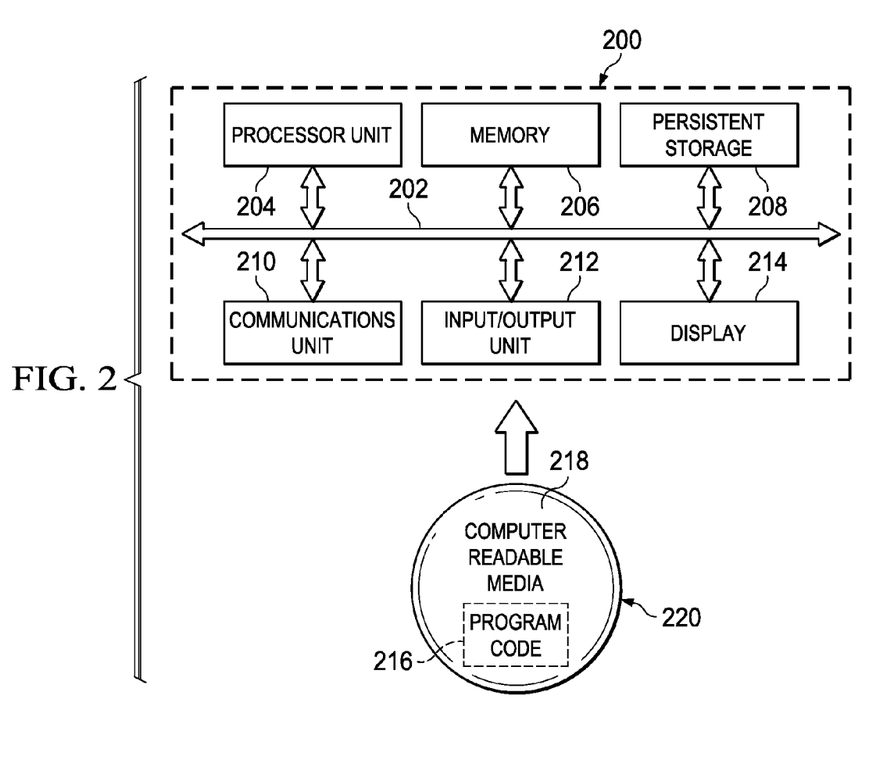
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connects to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Thus, the illustrative embodiments provide a method for selectively rating and viewing only a highlight scene in a media stream. A user recommended frame or frames of the video image is retrieved which allows subsequent users to navigate directly to the recommended scenes within the media stream.

A computer implemented method determines an interest level in various portions of a video. A media stream is retrieved. The media stream includes a plurality of frames. A composite rating counter is also retrieved. The composite rating counter includes a plurality of interest levels. Each of the interest levels corresponds to one of the plurality of frames. The media stream is then viewed at one of several playback rates. When a frame is viewed at normal playback rate, interest levels associated with the frame are increased by a normal amount. When a frame is viewed at a faster-than-normal playback rate, interest levels associated with the frame are increased by a decreased amount. If a user selection of the frame is received indicating an increased interest level in the frame, the associated rating counter is increased by an increased amount. If a user selection of the frame is received indicating a decreased interest level in the frame, the associated rating counter is decreased by the increased amount. The composite rating counter is then based on a current count of the interest levels. The updated composite interest level is then stored for future retrieval by a subsequent user.

Figure 3:
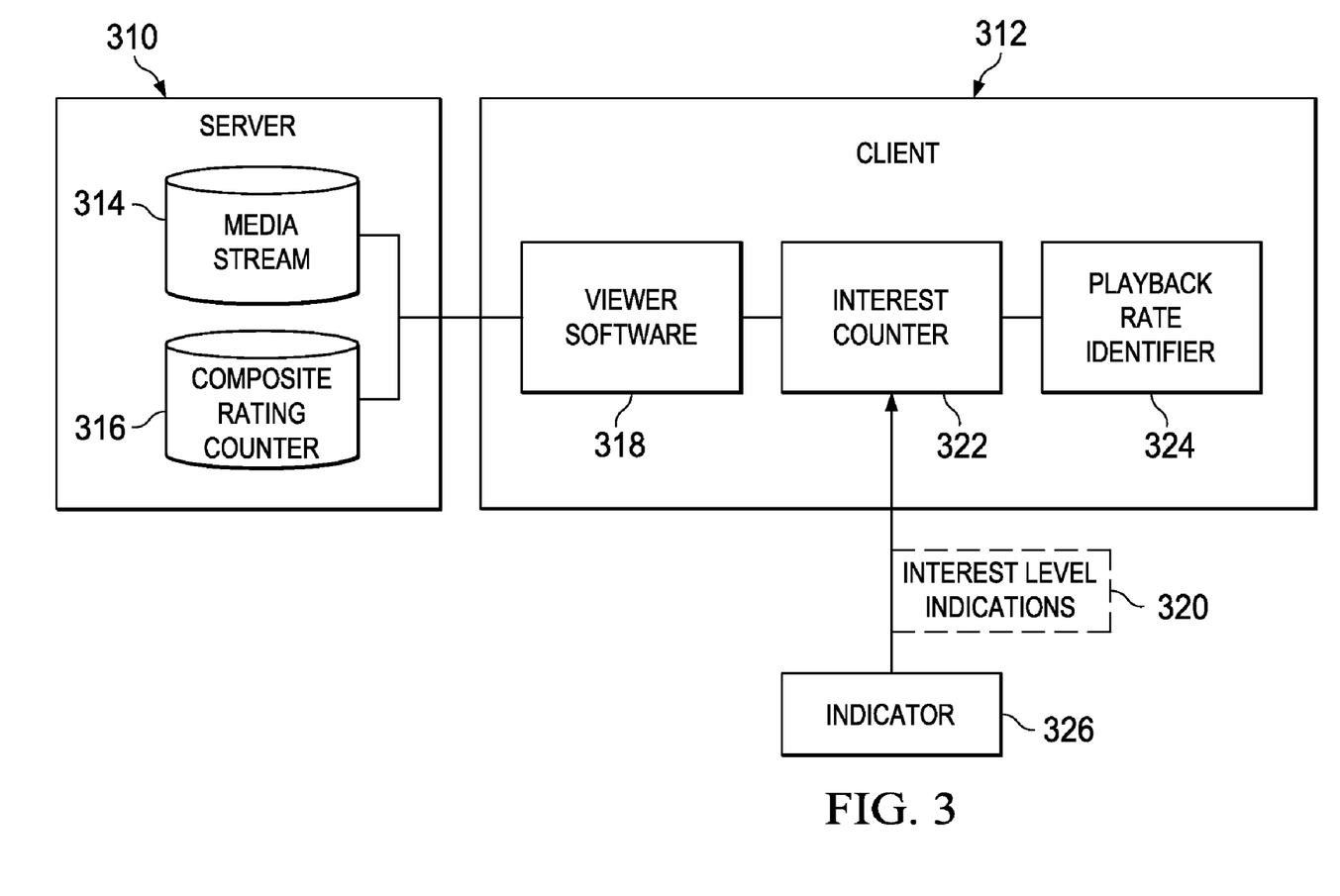
FIG. 3 is a data flow diagram of the various hardware and software components according to an illustrative embodiment.

Referring now to FIG. 3, a data flow diagram of the various hardware and software components is shown according to an illustrative embodiment. Server 310 can be server 104 or 106 of FIG. 1. Client 312 can be one of clients 110, 112, or 114 of FIG. 1.

Server 310 contains media stream 314. Media stream 314 is a media content that can be delivered to client 312. Media stream 314 can be any audio, video, or audio-video file that can be viewed by client 312. For example, media stream 314 can be, but is not limited to, a "video-on-demand," streaming or downloaded web content, and other recorded media. Media stream 314 is subdivided into frames, or other quantized sections that can be individually rated by a user.

Server 310 also contains composite rating counter 316. Composite rating counter 316 is a rating-over-time identification of an interest level that a user has in the various frames of media stream 314. Each frame of media stream 314 corresponds to an individual interest level as indicated by a user. The individual interest levels can then be sequenced together to create a view of composite rating counter 316. A view of composite rating counter 316 can include an over-time graphical indication of the user interest level. A view of composite rating counter 316 can include an indicated summation of the total interest level that users have indicated in the various frames of media stream 314. A view of composite rating counter 316 can also include a color coded indication of the cumulative interest level that users have indicated in the various frames of media stream 314.

Client 312 includes viewer software 318. Viewer software 318 is a control software that combines media stream 314 and composite rating counter 316 into a single viewable image. Viewer software 318 also can receive interest level indications 320 from a user, and adjust composite rating counter 316 in response thereto. Viewer software 318 also can adjust composite rating counter 316 in response to the various levels of playback at which media stream 314 is viewed by a user.

Viewer software 318 includes interest counter 322. Interest counter 322 receives an interest level indication 320 from a user. Based on receiving interest level indication 320, interest counter 322 adjusts the individual interest level for a corresponding frame of media stream 314. Viewer software 318 can then update composite rating counter 316 with an updated rating.

Viewer software 318 also includes playback rate identifier 324. Playback rate identifier 324 identifies a current playback rate for media stream 314. Based on identified playback rate for media stream 314, playback rate identifier 324 adjusts the individual interest level for a corresponding frame of media stream 314. Viewer software 318 can then update composite rating counter 316 with an updated rating.

In one illustrative embodiment, composite rating counter 316 is adjusted in proportion to the viewing rate at which the frames of media stream 314 are viewed. For example, during a normal playback of media stream 314, individual interest level for each frame of media stream 314 may be incremented by a certain unit. However, if the media stream is viewed at an increased playback rate, such as for example twice the normal playback rate, individual interest level for each frame of media stream 314 may be incremented by a fraction of that certain unit, for example, one half of the certain unit. Also, if the media stream is viewed at a decreased playback rate, for example, half the normal playback rate, individual interest level for each frame of media stream 314 may be incremented by multiple times of that certain unit, for example, double of that certain unit. This proportional decrease or increase in the individual interest level for each frame of media stream 314 can be further extended to include additional variation of playback rates. For example, the increase of individual interest level for each frame of media stream 314 could therefore be represented by the equation:

$$X=1/R$$

wherein:

X is the increase of individual interest level for the corresponding frame of media stream 314; and R is the playback rate at which the corresponding frame is viewed. Alternatively, X may be represented in other forms of equations that is inversely proportional to R.

In one illustrative embodiment, composite rating counter 316 can be further adjusted by identifying that a user has rewound a certain frames of media stream 314 in order to review those frames. Individual interest level for those reviewed frames of media stream 314 may be incremented by the certain unit, or a proportional fraction thereof.

In one illustrative embodiment, a user can be provided with interest indicator 326. Interest indicator 326 is a device, such as a remote control, a mouse, a keyboard, or other input apparatus, on which a user can indicate his interest level indication 320 for each frame of media stream 314 to interest counter 322. Interest indicator 326 may include a hardware device, such as a manipulatable switch, dial, mouse, or other input device that allows the user to indicate interest level indication 320 for the current frame of media stream 314. Interest indicator 326 may also be a graphical manipulatible icon in a graphical user interface. Interest indicator 326 can then communicate interest level indication 320 to interest counter 322. Viewer software 318 can then update composite rating counter 316 with an updated rating.

In one illustrative embodiment, media stream 314 is displayed within a window of a graphical user interface displayed by viewer software 318. The window is initially shown within a default window size. Composite rating counter 316 can be adjusted in proportion to the user resizing the window to a size smaller or larger than the default window size. For example, during a normal playback of media stream 314, individual interest level for each frame of media stream 314 may be incremented by a certain unit. However, if the window in which media stream 314 is viewed has been increased to a larger viewing area, such as, for example, twice the default window size, individual interest level for each frame of media stream 314 may be incremented by a multiple of that certain unit, for example, twice the certain unit. This proportional increase or decrease in the individual interest level for each frame of media stream 314 can be further extended to include additional window sizes. For example, the increase of individual interest level for each frame of media stream 314 could therefore be represented by the equation:

$$X'=W_{rs}*X$$

wherein:

X is the increase of individual interest level calculated using the playback rate for the corresponding frame of media stream 314; and X' is the increase of individual interest level adjusted using the window size; and $W_{rs}$ is the relative size of the resized window as compared to the default Alternatively, X' may be represented in other forms of equations that is proportional to $W_{rs}$.

In one illustrative embodiment, media stream 314 is displayed within a window of a graphical user interface displayed by viewer software 318. When multiple windows are opened, a window can be brought to top by selecting that window. After the window has been brought to top, the window that was previously top will be second in terms of the order in window layers. The order of window layers can be defined by a number called z-index. If the z-index of one window (A) is larger than that of another window (B), window (A) is in higher layer than window (B). Composite rating counter 316 can be adjusted depending on the z-index of viewer software 318. If the window in which media stream 314 is viewed has been moved to a lower layer (lower z-index), for example, z-index changes to the second largest value of all open windows, individual interest level for each frame of media stream 314 may be decreased to a fraction of the certain unit, for example, half the certain unit. This proportional decrease in the individual interest level for each frame of media stream 314 can be further extended to include additional order of z-index. For example, the increase of individual interest level for each frame of media stream 314 could therefore be represented by the equation:

$$X''=X'/Z$$

wherein:

X' is the increase of individual interest level calculated using playback rate and adjusted using window size; and X" is the increase of individual interest level adjusted using z-index; and Z is the order of z-index for the window viewing the media stream among all open windows Alternatively, X" may be represented in other forms of equations that is inversely proportional to Z.

Figure 4:
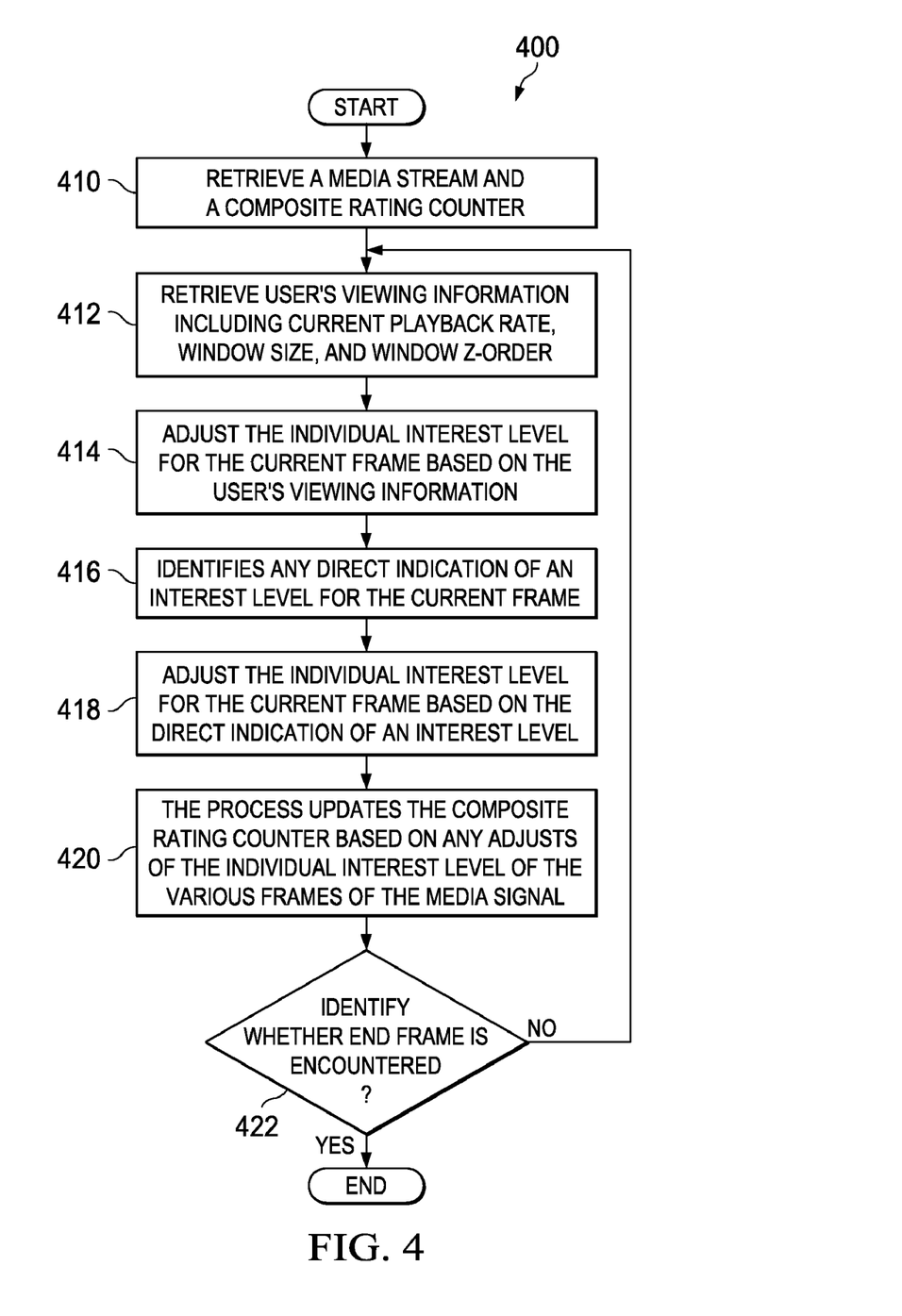
FIG. 4 is a flowchart showing the processing steps of a client side video browsing based on collaborative information according to an illustrative embodiment.

Referring now to FIG. 4, a flowchart showing the processing steps of a client side video browsing based on collaborative information is shown according to an illustrative embodiment. Process 400 is a software process, executing on a software component, such as viewer software 318 of FIG. 3.

Process 400 begins by retrieving a media stream and a composite rating counter (step 410). The media stream can be media stream 314 of FIG. 3. The composite rating counter can be composite rating counter 316 of FIG. 3.

Playing the video can be a real time presentation of the media stream which can be a streaming video that is played to the user as it is received from the server. Playing the video may also include buffering, or storing, the media stream into a local storage for later playback. A user is not playing the media stream when the media stream is not presented in a playback format. For example, a user may be presented with a series of thumbnail images corresponding to various frames of the media stream. Viewing these thumbnail images would not be playing the media stream.

Process 400 retrieves user's viewing information including current playback rate, window size, window z-order (step 412), and adjusts the individual interest level for the current frame based on these user's viewing information (step 414). If the user is viewing the media stream at a normal playback rate, an individual interest level for the current frame of the media stream may typically be incremented by a certain unit. However, if the media stream is viewed at an increased playback rate, such as for example twice the normal playback rate, individual interest level for each frame of the media stream may be incremented by a fraction of that certain unit, for example, one half of the certain unit. This proportional decrease in the individual interest level for each frame of the media stream can be further extended to include additional accelerated playback rates. Additionally, if the window of a graphical user interface displayed by viewer software is resized to a larger or smaller viewing area as compared to its default size, an individual interest level for each frame can be increased or decreased proportionally to its relative size to default window size. Furthermore, if the z-order for the window of a graphical user interface displayed by viewer software is changed, an individual interest level for each frame can be increased or decreased inversely proportional to the order of z-index among all open windows.

Process 400 identifies any direct indication of an interest level for the current frame (step 416), and adjusts the individual interest level for the current frame based on the direct indication of an interest level (step 418). A user can be provided with interest indicator, such as a remote control, a mouse, a keyboard, or other input apparatus, on which a user can directly indicate an interest level for each frame of media stream. Process 400 can identify the direct indication of an interest level for the current frame based on input from the interest indicator. The interest indicator may be interest indicator 326 of FIG. 3. In one illustrative embodiment, interest indicator can be buttons 514 and 516 of FIG. 5, where interest levels for the current frame are respectively increased or decreased by a certain unit when the buttons are pressed.

Process 400 then updates the composite rating counter based on any adjustments the individual interest level of the various frames of the media signal (step 420). Process 400 then identifies whether an end frame is encountered (step 422). The end frame identifies the end of the media stream. If the end frame is not yet encountered ("no" at step 422), then process 400 returns to step 414 for evaluation of the next frame. If the end frame is encountered ("yes" at step 422), the process terminates.

Figure 5:
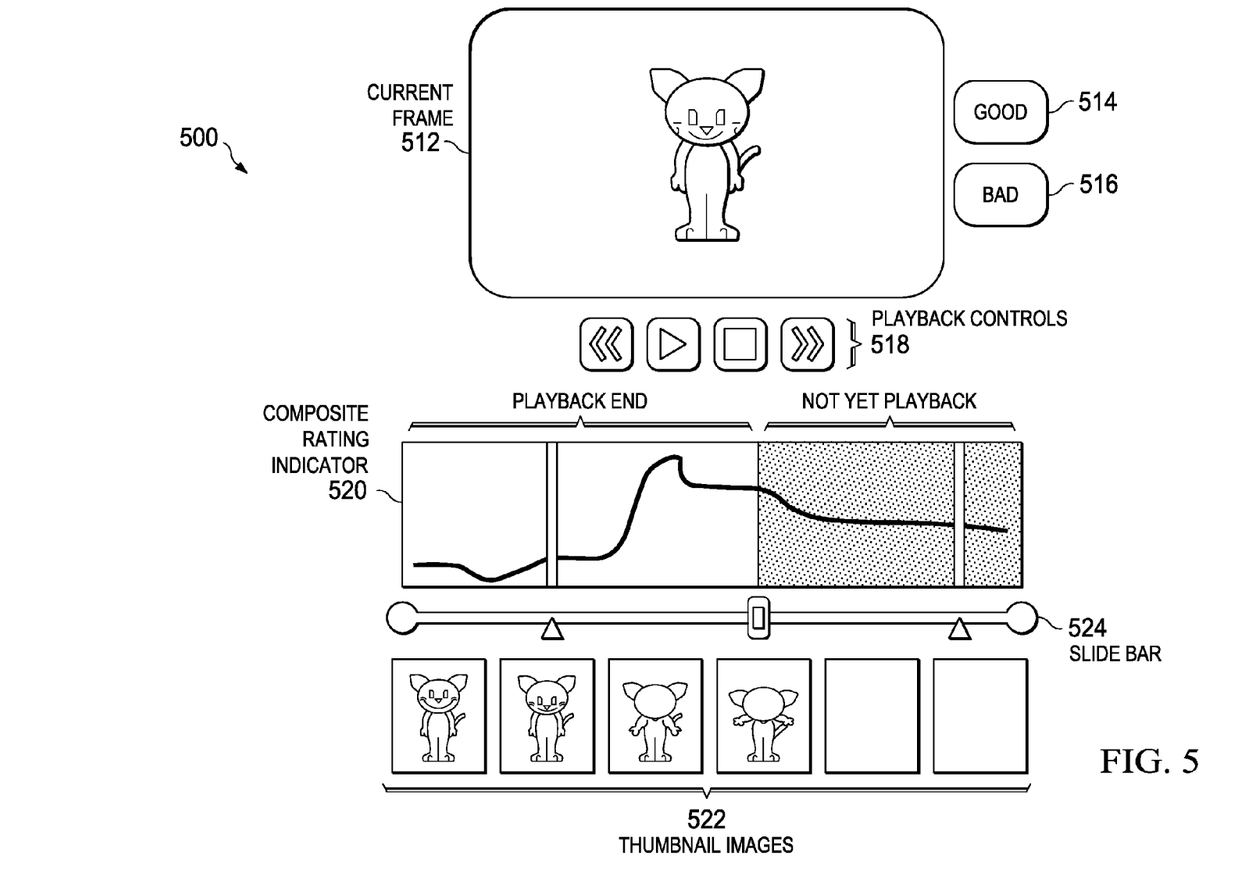
FIG. 5 is an exemplary screen shot of the video rating method according to an illustrative embodiment.

Referring now to FIG. 5, an exemplary screen shot of the video rating method is shown according to an illustrative embodiment. Screenshot 500 is displayed on a client, such as client 312 of FIG. 3.

Image 512 is a graphical image of the current frame of the media stream, which can be media stream 314 of FIG. 3.

Interest indicators 514 and 516, which can be Interest indicator 326 of FIG. 3, allow a user to provide direct indication of an interest level for image 512 of the current frame. Interest indicator 514 can be used to increase the interest level of the current frame, while interest indicator 516 can be used to decrease the interest level of the current frame.

Playback controls 518 allow the user to manipulate the playback of the media stream, as well as control the rate of playback for the media stream. A normal rate of playback may cause the individual interest level for each frame of the media stream to be incremented by a certain unit. However, if the media stream is viewed at an increased playback rate, such as for example twice the normal playback rate, individual interest level for each frame of the media stream may be incremented by a fraction of that certain unit, for example, one half of the certain unit.

Composite rating indicator 520 is an over-time graphical indication of the user interest level. Composite rating indicator 520 is an indicated summation of the total interest level that users have indicated in the various frames of the media stream. While the illustrative embodiment shows composite rating indicator 520 as a time sensitive graph, other embodiments of composite rating indicator 520 can include a color coded indication of the cumulative interest level that users have indicated in the various frames of the media stream.

Thumbnail images 522 correspond to various frames of the media stream. A user can select the frame corresponding to one of thumbnail images 522 by indicating a selection of one of thumbnail images 522. In an illustrative embodiment, the individual interest level for the current frame of the media stream may typically be incremented by a certain unit, which can be an increment of the certain unit of normal playback. For example, the individual interest level for the current frame may be increased by a multiple of the normal playback unit increase.

Slide bar 524 is a control that can be used to jump to an arbitrary frame in the media stream. If a user clicks on a certain point of the slider bar 524, playback will start from the frame corresponding to that point, and individual interest levels will be increased for the frames corresponding to ones displayed after that point. Also, user may drag the slider bar 524 at a certain speed, and image 512 being displayed is updated while user is dragging. For example, if the slider bar is dragged by a mouse at a half the speed as compared to the normal playback rate, an individual interest level can be increased by a twice the certain unit. Whereas, if it is dragged in a twice the speed as compared to the normal playback rate, an individual interest level is increased by a half the certain unit.

Thus, the illustrative embodiments provide a method for selectively rating and viewing only a highlight scene in a media stream. A user recommended frame or frames of the video image is retrieved which allows subsequent users to navigate directly to the recommended scenes within the media stream.

A computer implemented method determines an interest level in various portions of a video. A media stream is retrieved. The media stream includes a plurality of frames. A composite rating counter is also retrieved. The composite rating counter includes a plurality of interest levels. Each of the interest levels corresponds to one of the plurality of frames. The media stream is then viewed at one of several playback rates. When a frame is viewed at normal playback rate, interest levels associated with the frame are increased by a normal amount. When the frame is viewed at a faster-than-normal playback rate, interest levels associated with the frame are increased by a decreased amount. If a user selection of the frame is received indicating an increased interest level in the frame, the associated rating counter is increased by an increased amount. If a user selection of the frame is received indicating a decreased interest level in the frame, the associated rating counter is decreased by the increased amount. The composite rating counter is then based on a current count of the first interest levels. The updated composite interest level is then stored for future retrieval by a subsequent user.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for determining an interest level in various portions of a video at a client device, the method comprising:
    retrieving a media stream by the client device, wherein the media stream comprises a plurality of frames;
    retrieving a composite rating counter by the client device, the composite rating counter comprising a plurality of interest levels, wherein each of the interest levels corresponds to one of the plurality of frames;
    viewing the media stream at the client device, at least one of several playback rates;
    responsive to viewing a frame of the plurality of frames at normal playback rate, increasing an interest level of the plurality of interest levels associated with the frame by a normal amount;
    responsive to viewing the frame at a faster-than-normal playback rate, increasing an associated rating counter by a decreased amount;
    responsive to receiving a user selection of the frame indicating an increased interest level in the frame, increasing the associated rating counter by an increased amount;
    responsive to receiving a user selection of the frame indicating an decreased interest level in the frame, decreasing the associated rating counter by an increased amount;

responsive to a user resizing a window to a size larger than a default window size to view the frame, increasing the interest level by a proportional amount;

responsive to the user resizing a window to a size smaller than the default window size to view the frame, decreasing the interest level by the proportional amount, wherein the proportional amount is represented by the equation $X'=W_{rs}*X$, wherein X is the increase of individual interest level calculated using the playback rate for the corresponding frame of media stream, X' is the increase of individual interest level adjusted using the window size, and $W_{rs}$ is the relative size of the resized window as compared to the default updating the composite rating counter based on a current count of the interest level;

storing the composite rating counter.

2. The computer implemented method of claim 1 further comprising:

receiving the user selection of the frame via a graphical user interface indicating the increased interest level in the frame.

3. The computer implemented method of claim 1, further comprising:

receiving the user selection of the frame via a graphical user interface indicating the decreased interest level in the frame.

* * * * *